US012654772B2

(12) United States Patent
Im et al.

(10) Patent No.: US 12,654,772 B2
(45) Date of Patent: Jun. 16, 2026

(54) APPARATUS AND METHOD FOR CONTROLLING VEHICLE STABILITY BASED ON REAR WHEEL STEERING

(71) Applicant: HL Mando Corporation, Pyeongtaek-si (KR)

(72) Inventors: Yonghyeon Im, Pyeongtaek-si (KR); Jaewoo Lee, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 80 days.

(21) Appl. No.: 18/630,273

(22) Filed: Apr. 9, 2024

(65) Prior Publication Data

US 2025/0222981 A1     Jul. 10, 2025

(30) Foreign Application Priority Data

Jan. 5, 2024    (KR) ........................ 10-2024-0002160

(51) Int. Cl.
*B62D 7/15*         (2006.01)
*B62D 5/04*         (2006.01)

(52) U.S. Cl.
CPC ............. *B62D 7/159* (2013.01); *B62D 5/046* (2013.01)

(58) Field of Classification Search
CPC ... B60Y 2400/84; B62D 5/0421; B62D 7/159
See application file for complete search history.

(56) References Cited

U.S. PATENT DOCUMENTS 4,842,089 A * 6/1989 Kimbrough ............ B62D 7/159
                                                                180/413
5,375,057 A * 12/1994 Ackermann ........... B62D 7/159
                                                                180/408
(Continued)

FOREIGN PATENT DOCUMENTS

DE    10 2006 042 961 A1    4/2007
DE    10 2011 111 024 A1    3/2012
(Continued)

OTHER PUBLICATIONS

[Supportive materials for Exception to Loss of Novelty] Yonghyeon Im et al., "Rear Wheel Steering Control Algorithm based on Linear Parameter Varying Control", KSAE 2023 Annual Autumn Conference & Exhibition, Nov. 16, 2023, with English translation, 4 pages.
(Continued)

*Primary Examiner* — Logan M Kraft
*Assistant Examiner* — Joshua Campbell
(74) *Attorney, Agent, or Firm* — Hauptman Ham, LLP

(57)         ABSTRACT

An apparatus for controlling vehicle stability based on RWS comprises a vehicle status reference generator generating a reference, which represents a vehicle status, based on a front wheel steer angle, a drive mode, and a sensor signal transmitted from an in-vehicle network, a vehicle status estimator estimating lateral velocity and disturbance, based on front and rear wheel steer angles and the sensor signal transmitted from the in-vehicle network, an RWS target position calculator generating an RWS target position value, based on the reference generated from the vehicle status reference generator, the sensor signal transmitted from the in-vehicle network, the front wheel steer angle, and the lateral velocity and disturbance estimated from the vehicle status estimator, and an RWS position controller generating target motor torque, based on the RWS target position value calculated
(Continued)

100 from the RWS target position calculator and an RWS rack position value.

15 Claims, 7 Drawing Sheets

(56)  References Cited

U.S. PATENT DOCUMENTS

| | | | | |
|---|---|---|---|---|
| 6,553,293 | B1 * | 4/2003 | Hac ........................ | B62D 7/159 |
| | | | | 701/72 |
| 9,731,755 | B1 * | 8/2017 | Moshchuk ............... | B62D 6/04 |
| 2008/0015754 | A1 | 1/2008 | Hac | |
| 2008/0243339 | A1 * | 10/2008 | Nishimori ............. | B60G 7/003 |
| | | | | 701/41 |
| 2019/0077444 | A1 * | 3/2019 | Kim ................... | B62D 15/0225 |
| 2021/0146920 | A1 * | 5/2021 | Park ..................... | B60W 10/20 |

FOREIGN PATENT DOCUMENTS

| | | | | |
|---|---|---|---|---|
| DE | 10 2020 109 883 A1 | 5/2021 | | |
| DE | 10 2022 109 861 A1 | 6/2023 | | |
| DE | 10 2022 204 246 A1 | 11/2023 | | |
| KR | 20180068681 A | * | 6/2018 | ...... B60W 30/18145 |
| KR | 10-2019-0119295 A | 10/2019 | | |
| KR | 10-2263187 B1 | 6/2021 | | |
| KR | 10-2463701 B1 | 11/2022 | | |
| KR | 10-2023-0073842 A | 5/2023 | | |

OTHER PUBLICATIONS

German Office Action issued on Jul. 23, 2024, in connection with the German Patent Application No. 102024110756.1 with its English translation, 8 pages.

Office Action issued on Nov. 10, 2025, for corresponding Korean Patent Application No. 10-2024-0002160, along with an English machine translation (10 pages).

* cited by examiner

APPARATUS AND METHOD FOR CONTROLLING VEHICLE STABILITY BASED ON REAR WHEEL STEERING

CROSS-REFERENCE TO RELATED APPLICATION

This application claims priority under 35 U.S.C. § 119 to Korean Patent Application No. 10-2024-0002160, filed on Jan. 5, 2024, in the Korean Intellectual Property Office (KIPO), the disclosure of which is incorporated by reference herein in its entirety.

TECHNICAL FIELD

The present disclosure generally relates to an apparatus and method for controlling vehicle stability based on a Rear Wheel Steering (RWS) system. Specifically, some embodiments of the present disclosure may provide an apparatus and method for controlling vehicle stability based on RWS to apply an independent stability control function using the RWS.

BACKGROUND

An RWS system is a driver assistance system that is designed to enable a quick steering response by reducing a turning radius when a vehicle is driving at low speeds, and to increase vehicle stability while turning when the vehicle is driving at high speeds. The RWS system especially contributes to improved operability in a narrow space and enhanced driving stability during high-speed driving.

A conventional RWS control method is performed using a feedforward control method. In other words, this is a method of deriving a rack position target value of the RWS system by setting a specific ratio for the steer angles of front and rear wheels. When the vehicle is traveling at low speeds, the steer angles of the front and rear wheels are adjusted in opposite directions (out-of-phase) to enable quicker rotation. When the vehicle is traveling at high speeds, both the steer angles are adjusted in the same direction (in-phase) to enable stable turning.

However, the existing feedforward control method requires tuning according to each vehicle and driving situation. This process requires considerable time and experience. A non-optimized tuning value may make it difficult to reliably control vehicle stability, so ratio tuning is of great importance. However, this ratio tuning is experience-dependent, unintuitive, and time-consuming. In addition, despite sufficient tuning, disturbance such as changes in road surface conditions or vehicle characteristics may prevent proper operation, causing the vehicle to become unstable or leading to a dangerous situation.

Although a stability control function such as Electronic Stability Control (ESC) is developed and applied, there is a need for an independent stability control function using RWS in preparation for malfunction, defect, or absence. Accordingly, there is a need to implement vehicle stability through a new method rather than the feedforward control method in which it is difficult to quickly respond to changes in surrounding environment.

PRIOR ART DOCUMENT (Patent Document 1) Korean Patent No. 10-2263187 (2021 Jun. 3.)

(Patent Document 1) Korean Patent No. 10-2463701 (2022 Nov. 1.)

SUMMARY

The present disclosure may provide a method and apparatus for controlling vehicle stability based on RWS, which enables intuitive and efficient tuning and may replace a conventional method.

Further, the present disclosure may provide intuitive tuning in terms of vehicle dynamics, thereby reducing time required for tuning and allowing the performance of a vehicle to be more efficiently optimized.

Furthermore, the present disclosure may enhance a user experience by offering varied response characteristics depending on a drive mode, and may provide a personalized driving environment tailored to the driving styles and conditions of individual drivers.

However, the technical challenges addressed by the present disclosure are not limited to the above-described technical challenges, and there may be additional technical challenges.

According to embodiments of the present disclosure, an apparatus for controlling vehicle stability based on Rear Wheel Steering (RWS) may comprise a vehicle status reference generator generating a reference, which represents a vehicle status, based on a front wheel steer angle, a drive mode, and a sensor signal transmitted from an in-vehicle network; a vehicle status estimator estimating lateral velocity and disturbance, based on front and rear wheel steer angles and the sensor signal transmitted from the in-vehicle network; an RWS target position calculator generating an RWS target position value, based on the reference generated from the vehicle status reference generator, the sensor signal transmitted from the in-vehicle network, the front wheel steer angle, and the lateral velocity and disturbance estimated from the vehicle status estimator; and an RWS position controller generating target motor torque, based on the RWS target position value calculated from the RWS target position calculator and an RWS rack position value.

The vehicle status reference generator may comprise a vehicle parameter curve set unit, a target vehicle parameter selector, and a reference calculator, the vehicle parameter curve set unit may determine one curve set among a plurality of curve sets composed of pairs of a wheel base curve that defines vehicle response characteristics depending on the drive mode and a center of gravity (C.O.G.) curve, the target vehicle parameter selector may select a wheel base and a C.O.G. position based on a vehicle's current speed and the curve set determined by the vehicle parameter curve set unit, and the reference calculator may calculate a reference, based on the front wheel steer angle and the wheel base and the C.O.G. position selected by the target vehicle parameter.

Calculating the reference based on the wheel base and the C.O.G. position selected by the target vehicle parameter selector may comprise calculating the reference by receiving the wheel base and the C.O.G. position as input values to a two-wheel steering-based dynamic model.

The two-wheel steering-based dynamic model may be a steady-state dynamic model, and the steady-state dynamic model may be defined by the following Equations 1 to 3, $$\gamma = \frac{V_x}{L + K_{us}V_x^2}\delta_f \qquad \text{[Equation 1]}$$

-continued $$V_y = \frac{V_x \left( l_r - \left( \frac{M l_f V_x^2}{C_r L} \right) \right)}{L + K_{us} V_x^2} \delta_f \qquad \text{[Equation 2]}$$

$$K_{us} = \frac{M}{L} \left( \frac{l_r}{C_f} - \frac{l_f}{C_r} \right) \qquad \text{[Equation 3]}$$

where L represents the wheel base of the vehicle, $V_x$ represents longitudinal velocity, $K_{us}$ represents a understeer gradient, $\delta_f$ represents the steer angle of the front wheel, $l_f=L\times x_{cog}$, $x_{cog}$ represents a C.O.G. position ratio, $l_r=L-l_f$, $l_f$ represents a length between a front axle and the center of gravity, $l_r$ represents a length between a rear axle and the center of gravity, M represents a mass of the vehicle, $C_f$ represents cornering stiffness of a front tire, and $C_r$ represents cornering stiffness of a rear tire.

The two-wheel steering-based dynamic model may be a single track dynamic model, and the single track dynamic model may be defined by the following Equation 4, $$\begin{bmatrix} \dot{V}_y \\ \dot{\gamma} \end{bmatrix} = \begin{bmatrix} -\frac{2(C_{\alpha f} + C_{\alpha r})}{m V_x} & -V_x - \frac{2(C_{\alpha f} l_f + C_{\alpha r} l_f)}{m V_x} \\ -\frac{2(C_{\alpha f} l_f + C_{\alpha r} l_r)}{I_z V_x} & -\frac{2(C_{\alpha f} l_f^2 + C_{\alpha r} l_r^2)}{I_z V_x} \end{bmatrix} \qquad \text{[Equation 4]}$$

$$\begin{bmatrix} V_y \\ \gamma \end{bmatrix} + \begin{bmatrix} \frac{2C_{\alpha f}}{m} \\ \frac{2C_{\alpha f} l_f}{I_z} \end{bmatrix} \delta_f$$

where $l_f=L\times x_{cog}$, $l_r=L-l_f$, L represents the wheel base of the vehicle, $l_f$ represents a length between the front axle and the center of gravity, $l_r$ represents a length between the rear axle and the center of gravity, $x_{cog}$ represents a C.O.G. position ratio, $C_{\alpha f}$ represents the cornering stiffness of the front tire, $C_{\alpha r}$ represents the cornering stiffness of the rear tire, $V_x$ represents longitudinal velocity, $\delta_f$ represents the steer angle of the front wheel, m represents the mass of the vehicle, and $I_z$ represents a z-axis rotational inertial moment of the vehicle.

According to another embodiment of the present disclosure, a method for controlling vehicle stability based on RWS, performed by an electronic control unit (ECU) of a vehicle, may comprise generating a reference, which represents a vehicle status, based on a front wheel steer angle, a drive mode, and a sensor signal transmitted from an in-vehicle network, by a vehicle status reference generator; estimating lateral velocity and disturbance, based on front and rear wheel steer angles and the sensor signal transmitted from the in-vehicle network, by a vehicle status estimator; calculating an RWS target position value, based on the vehicle status reference, the sensor signal transmitted from the in-vehicle network, the front wheel steer angle, and the estimated lateral velocity and disturbance, by an RWS target position calculator; and generating target motor torque, based on the calculated RWS target position value and an RWS rack position value, by an RWS position controller.

The generating of the reference which represents the vehicle status may comprise determining one curve set among a plurality of curve sets composed of pairs of a wheel base curve that defines vehicle response characteristics depending on the drive mode and a center of gravity (C.O.G.) curve; selecting a wheel base and a C.O.G. position based on a vehicle's current speed and the curve set determined by the vehicle parameter curve set unit, and calculating a reference, based on the front wheel steer angle, the wheel base and the C.O.G. position selected by the target vehicle parameter selector.

The calculating of the reference based on the wheel base and the C.O.G. position selected by the target vehicle parameter selector may comprise calculating the reference by receiving the wheel base and the C.O.G. position as input values to a two-wheel steering-based dynamic model.

The two-wheel steering-based dynamic model may be either of a steady-state dynamic model or a single track dynamic model.

According to another embodiment of the present disclosure, an apparatus for controlling vehicle stability based on a Rear Wheel Steering (RWS) system may comprise one or more memory units storing instructions; and one or more processors executing the instructions, wherein executing the instructions by the one or more processors causes the one or more processors to receive sensor data collected in an electronic device of the vehicle; to estimate a vehicle status using a vehicle status estimator; to generate a reference representing a vehicle status using a vehicle status reference generator; to calculate a target position value of the RWS system using a target position calculator of the RWS system; to calculate motor torque required for estimating a position of the RWS system using an RWS position controller; and to drive a motor for estimating the position of the RWS system using the calculated motor torque.

The executing of the instructions by the one or more processors may further cause the one or more processors to estimate lateral velocity and disturbance based on a sensor signal transmitted from an in-vehicle network and front and rear wheel steer angles, in estimating the vehicle status using the vehicle status estimator.

The executing of the instructions by the one or more processors may further cause the one or more processors to generate the reference representing the vehicle status, based on a drive mode, a sensor signal transmitted from an in-vehicle network and a front wheel steer angle, in generating the reference representing the vehicle status using the vehicle status reference generator.

The executing of the instructions by the one or more processors may further cause the one or more processors to update map data required for generating the reference representing the vehicle status using the vehicle status reference generator, in generating the reference representing the vehicle status using the vehicle status reference generator.

The executing of the instructions by the one or more processors may further cause the one or more processors to calculate the target position value of the RWS system, based on the front wheel steer angle, the vehicle status-representing reference generated by the vehicle status reference generator, the sensor signal transmitted from the in-vehicle network, and lateral velocity and disturbance estimated from the vehicle status estimator, in calculating the target position value of the RWS system using the target position calculator of the RWS system.

The executing of the instructions by the one or more processors may further cause the one or more processors to calculate target motor torque based on an RWS target position value generated by the RWS target position generator and an RWS rack position value, in calculating the motor torque required for estimating the position of the RWS system using the RWS position controller.

According to the present disclosure, it is possible to provide an independent stability control function using rear wheel steering (RWS), thereby preparing for the absence or failure of existing ESC stability control functions.

Further, the present disclosure may provide intuitive tuning in terms of vehicle dynamics, thereby reducing time required for tuning and allowing the performance of a vehicle to be more efficiently optimized.

Furthermore, the present disclosure may enhance a user experience by offering different response characteristics depending on a drive mode, and provide a personalized driving environment tailored to the driving styles and conditions of individual drivers.

DETAILED DESCRIPTION

Figure 1:
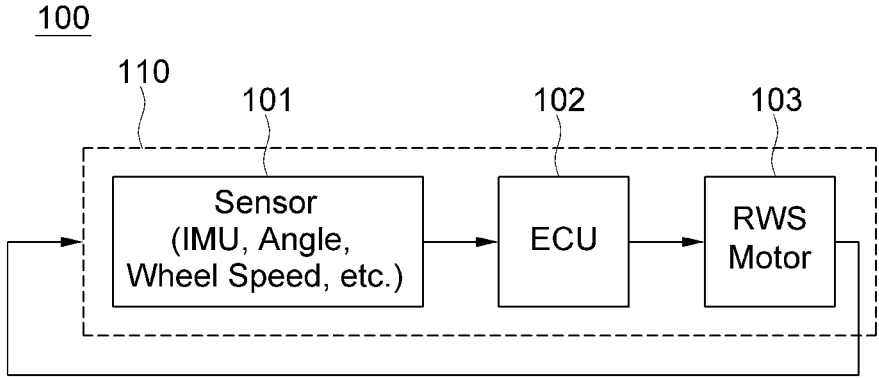
FIG. 1 is a block diagram schematically showing the main operating part of an RWS system according to an embodiment of the present disclosure.

Embodiments of the present disclosure will be described below in detail with reference to the accompanying drawings such that those skilled in the art can easily practice the present disclosure. When the present disclosure is described with reference to the accompanying drawings, components may be denoted by different reference numerals throughout the drawings even if the components are indicated with the same name. The reference numerals are designated merely for the convenience of description, and the concept, feature, function, or effect of each component is not limited by the reference numerals.

Hereinafter, a method and apparatus for controlling vehicle stability based on an RWS system according to the present disclosure will be described in detail with reference to the accompanying drawings.

FIG. 1 is a block diagram schematically showing the main operating part of an RWS system according to an embodiment of the present disclosure.

Referring to FIG. 1, the RWS system 100 may be included in a vehicle 110, and include a sensor unit 101, an ECU 102, and an RWS motor 103.

The sensor unit 101 may comprise an inertial measurement unit (IMU), a steer angle sensor, a wheel speed sensor, etc. The IMU may be a sensor configured to provide information about the movement of the vehicle 110, and measure the acceleration and rotation rate of the vehicle 110 by combining an accelerometer and a gyroscope. The measured data transmits information about the current movement state of the vehicle 110, such as pitch, yaw, or roll, to the ECU, providing data essential for controlling the stability of the vehicle 110. The steer angle sensor may be a sensor configured to detect a driver's steering input and transmit the input to the ECU. The steer angle sensor may play an important role in determining the direction of the vehicle 110 intended by the driver. The wheel speed sensor may measure the rotation speed of each wheel and provides the speed information of the vehicle 110 to the ECU in real time. In particular, this is information that is necessary to adjust the steering response of the RWS system depending on the speed of the vehicle 110.

The ECU 102 may act as the "brain" of the vehicle 110, and process and analyze data collected from sensors. The ECU 102 may integrate various pieces of data collected from the sensors of the vehicle 110 to provide overall information about the current status of the vehicle 110, and may apply control logic based on the integrated data to determine a task to be performed by the RWS motor 103. This may include the process of calculating the steer angle of a rear wheel to control the stability of the vehicle 110. Next, a steering signal may be sent to the RWS motor 103 to control the stability of the vehicle 110. Further, the ECU 102 may diagnose the problems of the system and manage communication with other vehicle systems.

The RWS motor 103 may be a driving device configured to adjust the steer angle of the rear wheel in response to a control signal received from the ECU 102. The RWS motor 102 may have precise control capability and fast response speed, and may exert sufficient force to overcome friction between a steering mechanism of the vehicle 110 and a road surface.

The operational relationship between the sensors of the sensor unit 101, the ECU 102, and the RWS motor 103 may have a sequential and repetitive process. The sensors may continuously collect data, and the data collected from the sensors may be transmitted to the ECU 102. The ECU 102 may process the transmitted data and give an instruction to the RWS motor 103 to adjust the RWS angle. The adjustment of the steer angle may change the trajectory of the vehicle 110, and the changed trajectory may be detected again by the sensors, creating a continuous loop of feedback and adjustment. The closed-loop system may enable a highly sensitive and adaptable RWS system. When the driver may make the steering input, the steer angle sensor may inform the ECU 102 of an intended direction, the ECU 102 may calculate an optimal RWS angle based on the current dynamic data of the vehicle 110 and adjust the RWS motor 103. The RWS motor 103 may adjust the rear wheel to aid maneuverability while maintaining the stability of the vehicle 110. The result of this adjustment may be continuously monitored by the sensors and adapted in real time.

Figure 2:
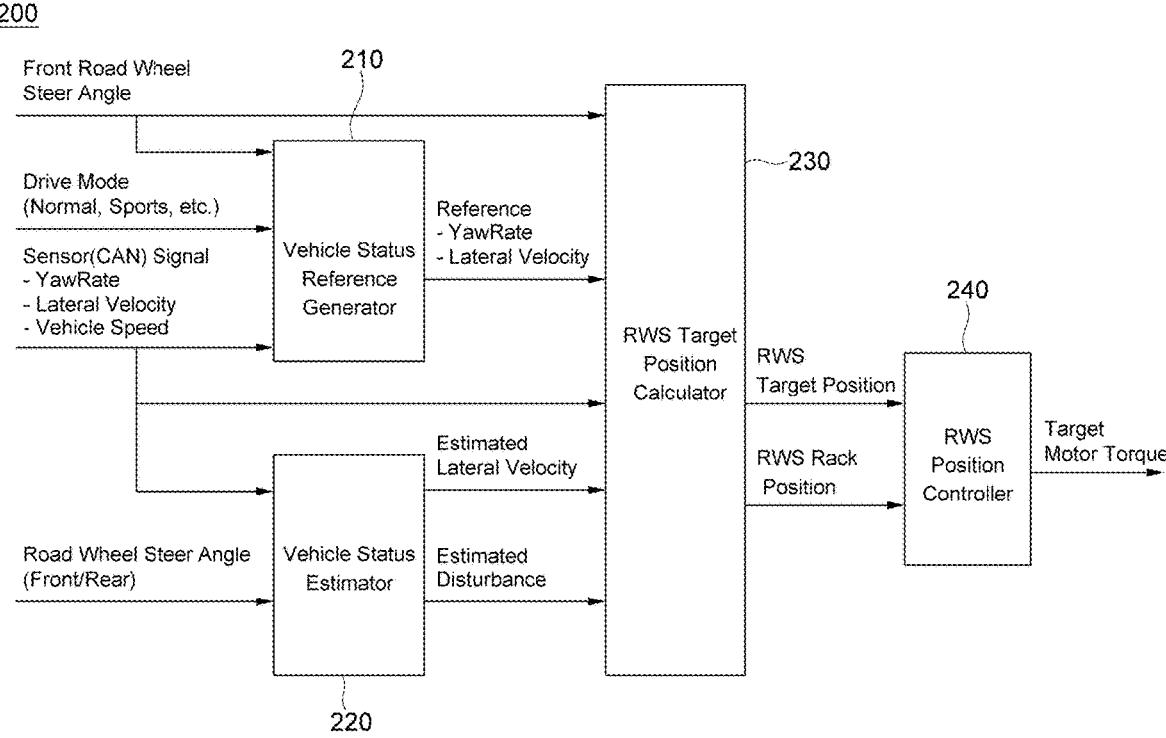
FIG. 2 is a block diagram showing an apparatus for controlling vehicle stability based on RWS according to an embodiment of the present disclosure.

FIG. 2 is a block diagram showing an apparatus for controlling vehicle stability based on RWS according to an embodiment of the present disclosure.

The vehicle stability controlling apparatus 200 based on the RWS, which is shown in FIG. 2, may be performed by the ECU 102 shown in FIG. 1 and performed by at least one processor included in the EUC 102. Instructions for operating the processors may be stored in a memory included in the ECU 102, but the processor may be integrated with the memory rather than being separate from the memory. For example, the memory may be implemented as a non-volatile memory such as ROM, PROM, EPROM, EEPROM, flash memory, PRAM, MRAM, RRAM, or FRAM, or may be implemented as a volatile memory such as DRAM, SRAM, SDRAM, PRAM, RRAM, or FeRAM.

Referring to FIG. 2, the vehicle stability controlling apparatus 200 based on the RWS may comprise a vehicle status reference generator 210, a vehicle status estimator 220, an RWS target position calculator 230, and an RWS position controller 240.

The vehicle status reference generator 210 may receive a front wheel steer angle, a drive mode, and a sensor signal transmitted from an in-vehicle network, and may generate a reference indicating a vehicle status. The front wheel steer angle may be transmitted to the vehicle status reference generator 210 in the form of data or information. The drive mode may be, for example, a normal mode, an eco-mode, a sports mode, a winter mode, etc. The data or information indicating the drive mode may be transmitted to the vehicle status reference generator 210. Further, acceleration and angular velocity from the IMU, the rotation speed of each wheel from the wheel speed sensor, and data from other sensors indicating the vehicle stability may be transmitted to the vehicle status reference generator 210. That is, data on the front wheel steer angle, data on the drive mode, and data from the sensors through the in-vehicle network may be transmitted to the vehicle status reference generator 210. For example, the in-vehicle network may use a Controller Area Network (CAN), a Local Interconnect Network (LIN), FlexRay, Ethernet, etc.

The vehicle status reference generator 210 may generate a 'reference signal' or a 'reference' indicating the vehicle status on the basis of data on the front wheel steer angle, data on the drive mode, and data from the sensors through the in-vehicle network.

The vehicle status estimator 220 may receive sensor signals and front wheel/rear wheel steer angles transmitted from the in-vehicle network, and may estimate lateral velocity and disturbance. The lateral velocity may refer to velocity at which the vehicle may move sideways even while driving in a straight line, and the lateral velocity may directly affect the vehicle stability and steering response. The disturbance may include environmental factors such as road slope, irregularities, and wind, or internal factors such as a change in vehicle load.

The RWS target position calculator 230 may receive the reference signal generated from the vehicle status reference generator 210 and the lateral velocity and disturbance estimated from the vehicle status estimator 220 to calculate an RWS target position value. The RWS target position calculator 230 may analyze the reference signal transmitted from the vehicle status reference generator 210 and may process data on the lateral velocity and disturbance provided by the vehicle status estimator 220. The RWS target position calculator 230 may calculate a target position value to be achieved by the RWS on the basis of the received data.

The RWS position controller 240 may receive an RWS target position value generated from the RWS target position calculator 230 and an RWS rack position value, and may calculate a target motor torque value. The RWS position controller 240 may generate the target motor torque value based on the received RWS target position value and the current rack position value. The target torque value may define torque that is to be generated by the motor of the RWS system, and may provide power that is required to adjust the steer angle of the vehicle through the RWS system.

Figure 3:
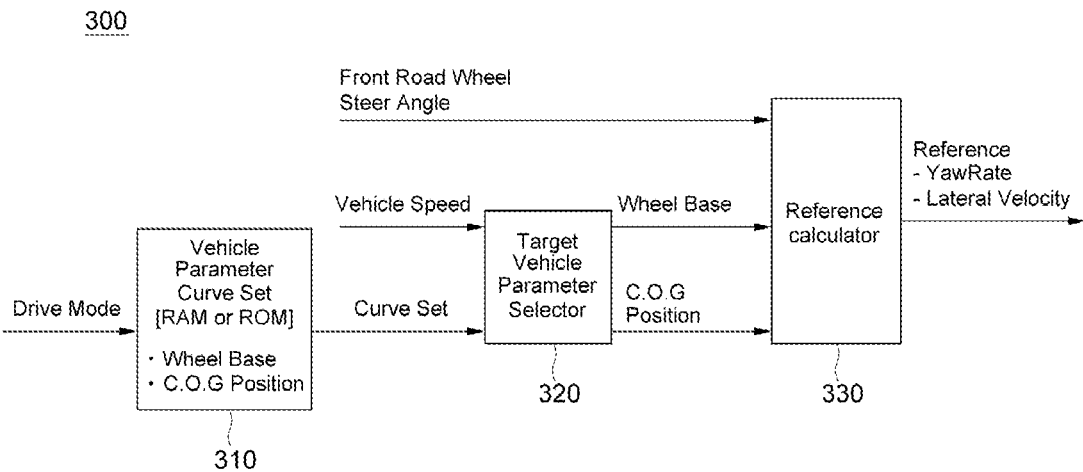
FIG. 3 is a block diagram showing the configuration of a vehicle status reference generator.

FIG. 3 is a block diagram showing the configuration of a vehicle status reference generator 300.

The vehicle status reference generator 300 of FIG. 3 may include and perform the function and operation of the vehicle status reference generator 210 according to the embodiment of FIG. 2. Referring to FIG. 3, the vehicle status reference generator 300 may include a vehicle parameter curve set unit 310, a target vehicle parameter selector 320, and a reference calculator 330. The vehicle parameter curve set unit 310 may store data in a memory such as RAM or ROM, and may change a curve set on the basis of the drive mode.

To be more specific, the vehicle status reference generator 300 may use a dynamic model based on two-wheel steering. The dynamic model based on the two-wheel steering may use, for example, steady-state dynamics or single track dynamics. The dynamic model based on the two-wheel steering, which is applied to the present disclosure, will be described in detail later.

The vehicle parameter curve set unit 310 may change or adjust the curve set representing the dynamic reaction of the vehicle according to the drive mode of the vehicle. Using data stored in the memory such as RAM or ROM, the response characteristics of the vehicle may be set differently for each drive mode. For example, in the sports mode, a curve for quicker steering response may be set. In the eco mode, a curve for optimizing fuel efficiency may be set. A method of changing or adjusting the parameter curve set according to the drive mode will be described in detail in FIG. 5, which will be described later.

The target vehicle parameter selector 320 may determine a wheel base and a center of gravity (C.O.G) position of the vehicle on the basis of the vehicle speed and the curve set changed in the vehicle parameter curve set unit 310.

Figure 4A:
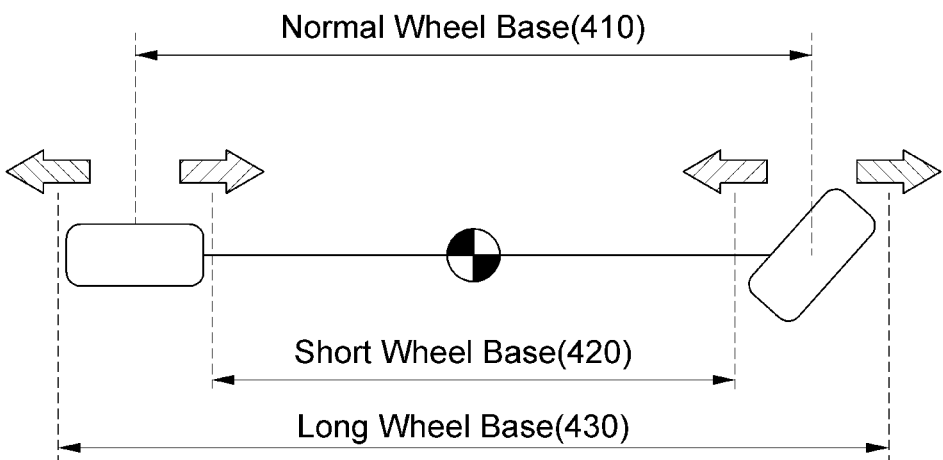
FIGS. 4A and 4B are diagrams showing a wheel base and a C.O.G. position ratio.
Figure 4B:
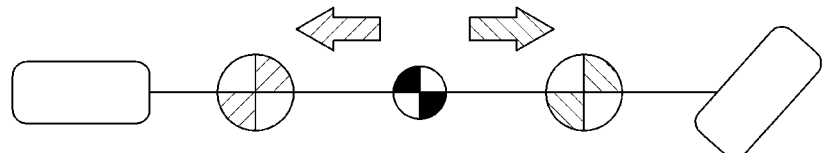

FIGS. 4A and 4B are diagrams showing a wheel base and a C.O.G. position ratio.

When the wheel base and the C.O.G. position ratio may be described with reference to FIGS. 4A and 4B, the wheel base may refer to a length between front wheel and rear wheel axles of the vehicle. By adjusting the wheel base according to the vehicle speed, a desired vehicle response may be created. For example, when driving at high speeds, the wheel base may be lengthened to raise stability. When driving at low speeds, the wheel base may be shortened to improve maneuverability. This adjustment may be made through electronic or mechanical devices.

The C.O.G. position ratio may refer to a ratio of a length from the front wheel to the C.O.G. point of the vehicle to an entire wheel base. By adjusting the C.O.G. position ratio, the center of gravity of the vehicle may be moved forward or backward to create the desired vehicle response. When the center of gravity moves forward, more weight may be applied to the front wheel of the vehicle, thereby increasing responsiveness to steering. When the center of gravity may move backward, the stability of the rear wheel may increase. That is, the wheel base and the C.O.G. position ratio may be set such that the vehicle may be optimized for given driving conditions through the design and adjustment of the vehicle.

Turning back to FIG. 3, the vehicle status reference generator 300 may change the response characteristics of the vehicle by adjusting the wheel base and the C.O.G. position ratio of the vehicle in real time according to the vehicle speed.

The reference calculator 330 may calculate the yaw rate and lateral velocity of the vehicle in consideration of the wheel base and the C.O.G. position together with the front wheel steer angle. That is, the vehicle parameter curve set unit 310 may determine one curve set among a plurality of curve sets composed of pairs of a wheel base curve that defines vehicle response characteristics depending on the drive mode and a C.O.G. curve, the target vehicle parameter selector 320 may determine the wheel base and the C.O.G. position based on the vehicle's current speed and the curve set, and the reference calculator 330 may combine the information with the front wheel steer angle to calculate the yaw rate and lateral velocity of the vehicle. The vehicle's dynamic state reference generated through this process may be used by a vehicle control system and may serve as a standard for ensuring vehicle stability and response to the driver's steering intention.

Figure 5:
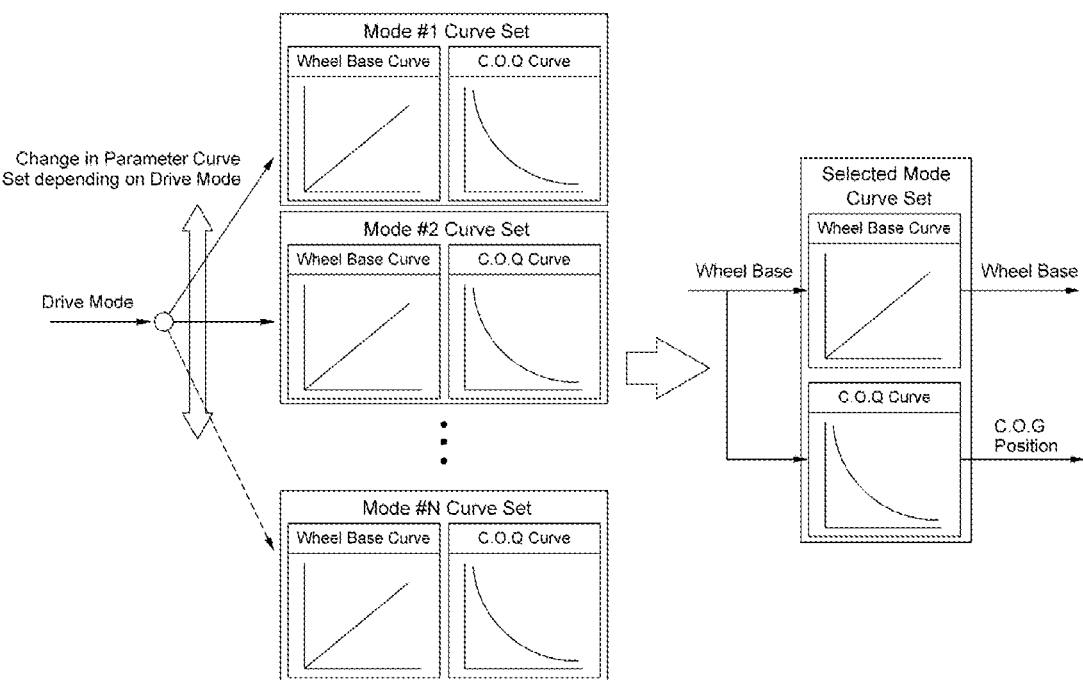
FIG. 5 is a diagram showing a method of changing a parameter as a drive mode changes.

FIG. 5 is a diagram showing a method of changing a parameter as a drive mode changes. Referring to FIG. 5, parameters determining the vehicle's response characteristics may be changed depending on the vehicle's drive mode. That is, the parameter curve set may be changed depending on the drive mode, and references with various response characteristics may be generated depending on the combination of the vehicle's wheel base and C.O.G. position curve set. Here, the x-axis of a wheel base graph may represent the vehicle speed, and the y-axis may represent the vehicle wheel base value, which may be set to a value greater than 0. Further, the x-axis of the C.O.G. graph may represent the vehicle speed, and the y-axis represents the center of gravity of the vehicle and may be a value between 0 and 1. If the center of gravity is at the front of the vehicle, the value is set to 0. If the center of gravity is at the rear of the vehicle, the value is set to 1.

Depending on the drive mode, a different set of curves composed of the wheel base curve and the C.O.G. curve may be selected. A selected curve set, for example, any one of a curve set for mode 1, a curve set for mode 2, and a curve set for mode N may be selected. The wheel base and C.O.G. position may then be adjusted based on the curve set selected depending on the vehicle speed.

Turning back to FIG. 3, the reference calculator 330 may create a reference by substituting the wheel base and C.O.G. position value into the two-wheel steering based dynamic model.

In an embodiment of the present disclosure, the two-wheel steering based dynamic model may be either the steady-state dynamic model or the single track dynamic model. However, without being limited thereto, the two-wheel steering-based dynamic model may be selected in various ways depending on the needs of the person skilled in the art.

When using the steady-state dynamic model according to an embodiment of the present disclosure, a yaw rate $\gamma$, a lateral velocity $V_y$, and a understeer gradient $K_{us}$ may be calculated according to Equations 1 to 3 below.

$$\gamma = \frac{V_x}{L + K_{us}V_x^2}\delta_f \qquad \text{[Equation 1]}$$

Here, L represents the wheel base of the vehicle, $V_x$ represents longitudinal velocity, $K_{us}$ represents the understeer gradient, and $\delta_f$ represents the steer angle of the front wheel.

$$V_y = \frac{V_x\left(l_r - \left(\frac{Ml_fV_x^2}{C_rL}\right)\right)}{L + K_{us}V_x^2}\delta_f \qquad \text{[Equation 2]}$$

Here, $l_f$=L×$x_{cog}$ and $l_r$=L−$l_f$, L represents the wheel base of the vehicle, $l_f$ represents a length between the front axle and the center of gravity, $l_r$ represents a length between the rear axle and the center of gravity, $x_{cog}$ represents a C.O.G. position ratio, $V_x$ represents a longitudinal velocity, $K_{us}$ represents the understeer gradient, $\delta_f$ represents the steer angle of the front wheel, and M represents the mass of the vehicle.

$$K_{us} = \frac{M}{L}\left(\frac{l_r}{C_f} - \frac{l_f}{C_r}\right) \qquad \text{[Equation 3]}$$

Here, $l_f$=L×$x_{cog}$ and $l_r$=L−$l_f$, L represents the wheel base of the vehicle, $l_f$ represents the length between the front axle and the center of gravity, $l_r$ represents the length between the rear axle and the center of gravity, $x_{cog}$ represents the C.O.G. position ratio, M represents the mass of the vehicle, $C_f$ represents the cornering stiffness of a front tire, and $C_r$ represents the cornering stiffness of a rear tire.

When using the single track dynamic model according to another embodiment of the present disclosure, the yaw rate $\gamma$ and the lateral velocity $V_y$ may be calculated according to Equation 4 below.

$$\begin{bmatrix} \dot{V}_y \\ \dot{\gamma} \end{bmatrix} = \begin{bmatrix} -\dfrac{2(C_{\alpha f} + C_{\alpha r})}{mV_x} & -V_x - \dfrac{2(C_{\alpha f}l_f + C_{\alpha r}l_f)}{mV_x} \\ -\dfrac{2(C_{\alpha f}l_f + C_{\alpha r}l_r)}{I_zV_x} & -\dfrac{2(C_{\alpha f}l_f^2 + C_{\alpha r}l_r^2)}{I_zV_x} \end{bmatrix} \qquad \text{[Equation 4]}$$

$$\begin{bmatrix} V_y \\ \gamma \end{bmatrix} + \begin{bmatrix} \dfrac{2C_{\alpha f}}{m} \\ \dfrac{2C_{\alpha f}l_f}{I_z} \end{bmatrix}\delta_f$$

Here, $l_f$=L×$x_{cog}$ and $l_r$=L−$l_f$, L represents the wheel base of the vehicle, $l_f$ represents the length between the front axle and the center of gravity, $l_r$ represents the length between the rear axle and the center of gravity, $x_{cog}$ represents the C.O.G. position ratio, $C_{\alpha f}$ represents the cornering stiffness of the front tire, $C_{\alpha r}$ represents the cornering stiffness of the rear tire, $V_x$ represents the longitudinal velocity, $\delta_f$ represents the steer angle of the front wheel, m represents the mass of the vehicle, and $I_z$ represents the z-axis rotational inertial moment of the vehicle.

Figure 6:
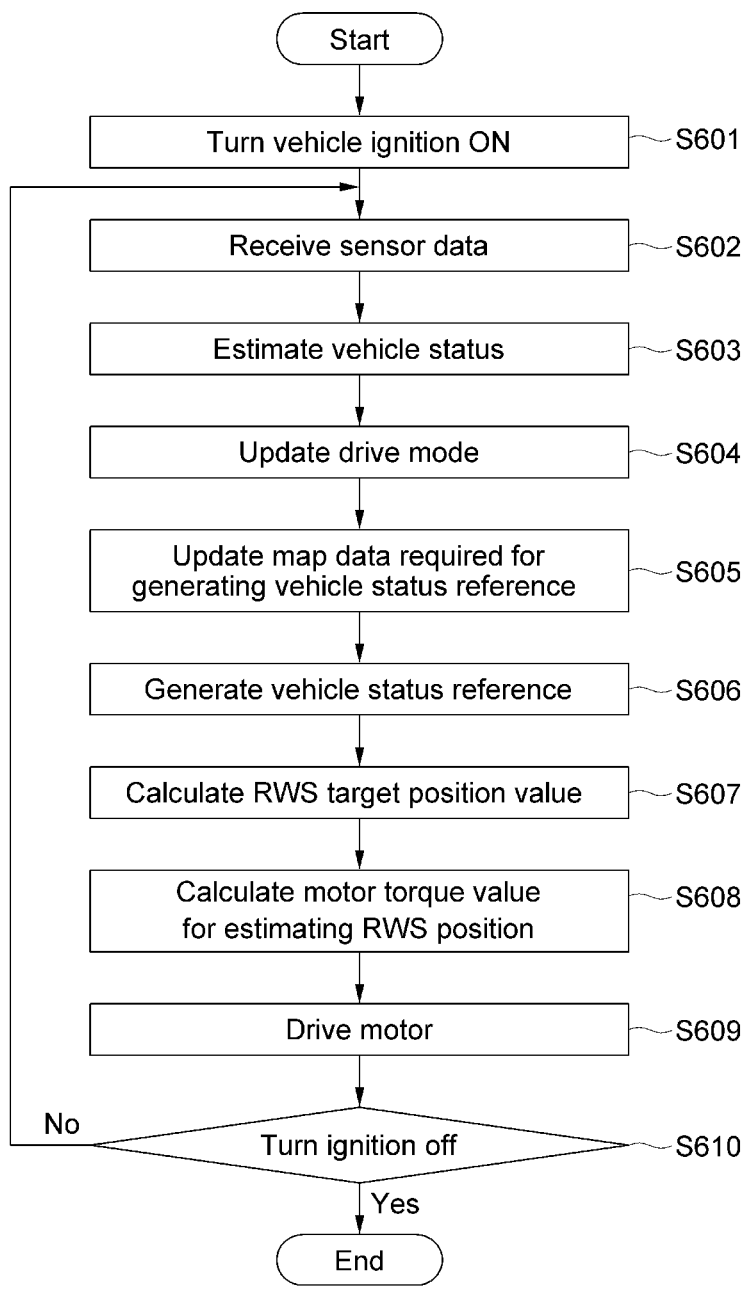
FIG. 6 is a flowchart showing a method for controlling vehicle stability based on RWS according to an embodiment of the present disclosure.

FIG. 6 is a flowchart showing a method for controlling vehicle stability based on an RWS system according to an embodiment of the present disclosure.

The method shown in FIG. 6 may be performed by an electronic control unit (ECU) of the vehicle, and may be performed by at least one processor included in the electronic control unit. Each function performed by at least one processor included in the electronic control unit may be divided in hardware according to the internal function of the processor to perform individual functions. Moreover, the electronic control unit may include a memory, and the memory may store instructions to perform the followings steps.

Referring to FIG. 6, when the vehicle ignition is in an ON state in step S601, sensor data may be received from the sensors of the vehicle in step S602. The sensors of the vehicle may include an inertial measurement unit (IMU), a steer angle sensor, and a wheel speed sensor, etc.

At step S603, the vehicle status estimator may estimate a vehicle status. More preferably, the sensor signal and the front and rear wheel steer angles transmitted from the in-vehicle network may be received to estimate lateral velocity and disturbance.

At step S604, the drive mode of the vehicle may be received and updated from the vehicle status reference generator. In step S605, map data required for generating the vehicle status reference may be received and updated.

At step S606, the vehicle status reference generator may generate a vehicle status reference. More preferably, the vehicle status reference generator may generate a reference representing the vehicle status using the two-wheel steering-based dynamic model. The two-wheel steering-based dynamic model may use the above-described steady-state dynamic model or single track dynamic model.

At step S607, the target position calculator of the RWS system may calculate the target position value of the RWS. More preferably, the front wheel steer angle, the vehicle-status-representing reference generated by the vehicle status reference generator, the sensor signal transmitted from the in-vehicle network, and the lateral velocity and disturbance estimated from the vehicle status estimator may be received, and the target position value of the RWS system may be calculated.

At step S608, the RWS position controller may calculate motor torque required to estimate the position of the RWS system. More preferably, the RWS target position value generated from the RWS target position generator and the RWS rack position value may be received, and then the required target motor torque may be calculated.

At step S609, the motor for estimating the position of the RWS system may be driven by the calculated motor torque.

At step S610, it is determined whether the ignition is OFF. When the ignition is OFF, the operation may be stopped. In contrast, when the ignition is not OFF, steps S602 to S609 may be repeated again.

The above-described apparatus and method may be implemented with hardware components, software components, and/or a combination of hardware components and software components. For example, apparatuses and components described in embodiments may be implemented using one or more general-purpose computers or special-purpose computers, like a processor, a controller, an arithmetic logic unit (ALU), a digital signal processor, a micro-computer, a field programmable gate array (FPGA), a programmable logic unit (PLU), a microprocessor, or any other devices capable of executing and responding to instructions. A processing device may execute an operating system (OS) and one or more software applications running on the OS. Further, the processing device may access, store, manipulate, process and generate data in response to the execution of software. For example, the processing device may include a plurality of processors or one processor and one controller. Furthermore, other processing configurations, such as a parallel processor, are possible.

Although embodiments of the invention have been described with reference to the accompanying drawings, it will be obvious to those skilled in the art that various changes and modifications may be made from the foregoing description. For example, even if the described techniques are performed in an order different from the described method, and/or components of the described system, structure, device, circuit, etc. are coupled or combined in a form different from the described method, or are replaced or substituted by other components or equivalents, proper results can be achieved.

Therefore, other implementations, other embodiments, and equivalents of the claims fall within the scope of the claims described below.

DETAILED DESCRIPTION OF MAIN ELEMENTS

| | |
|---|---|
| 100: RWS system | 101: sensor unit |
| 102: ECU | 103: RWS motor |
| 200: apparatus for controlling vehicle stability based on RWS | |
| 210: vehicle status reference generator | |

-continued

| | |
|---|---|
| 220: vehicle status estimator | 230: RWS target position calculator |
| 240: RWS position controller | 300: vehicle status reference generator |
| 310: vehicle parameter curve set unit | 320: target vehicle parameter selector |
| 330: reference calculator | |

What is claimed is:

1. An apparatus for controlling vehicle stability based on Rear Wheel Steering (RWS), the apparatus comprising:
   a vehicle status reference generator generating a reference, which represents a vehicle status, based on a front wheel steer angle, a drive mode, a curve set, and a sensor signal transmitted from an in-vehicle network;
   a vehicle status estimator estimating lateral velocity and disturbance, based on front and rear wheel steer angles and the sensor signal transmitted from the in-vehicle network;
   an RWS target position calculator generating an RWS target position value, based on the reference generated from the vehicle status reference generator, the sensor signal transmitted from the in-vehicle network, the front wheel steer angle, and the lateral velocity and disturbance estimated from the vehicle status estimator; and
   an RWS position controller generating target motor torque, based on the RWS target position value calculated from the RWS target position calculator and an RWS rack position value,
   wherein the curve set is selected among a plurality of curve sets composed of pairs of a wheel base curve that defines vehicle response characteristics depending on the drive mode and a center of gravity (C.O.G.) curve.

2. The apparatus of claim 1, wherein the vehicle status reference generator comprises a vehicle parameter curve set unit, a target vehicle parameter selector, and a reference calculator,
   the vehicle parameter curve set unit determines one curve set among the plurality of curve sets,
   the target vehicle parameter selector selects a wheel base and a C.O.G. position based on a vehicle's current speed and the curve set determined by the vehicle parameter curve set unit, and
   the reference calculator calculates a reference, based on the front wheel steer angle, the wheel base and the C.O.G. position selected by the target vehicle parameter selector.

3. The apparatus of claim 2, wherein calculating the reference based on the wheel base and the C.O.G. position selected by the target vehicle parameter selector comprises calculating the reference by receiving the wheel base and the C.O.G. position as input values to a two-wheel steering-based dynamic model.

4. The apparatus of claim 3, wherein the two-wheel steering-based dynamic model is a steady-state dynamic model, and the steady-state dynamic model is defined by the following Equations 1 to 3, $$\gamma = \frac{V_x}{L + K_{us}V_x^2}\delta_f \qquad \text{[Equation 1]}$$

-continued $$V_y = \frac{V_x\left(l_r - \left(\frac{Ml_f V_x^2}{C_r L}\right)\right)}{L + K_{us}V_x^2}\delta_f \qquad \text{[Equation 2]}$$

$$K_{us} = \frac{M}{L}\left(\frac{l_r}{C_f} - \frac{l_f}{C_r}\right) \qquad \text{[Equation 3]}$$

where γ represents a yaw rate, L represents the wheel base of the vehicle, $V_x$ represents longitudinal velocity, $K_{us}$ represents a understeer gradient, $\delta_f$ represents the steer angle of the front wheel, $V_y$ represents a lateral velocity, $l_f=L\times x_{cog}$, $x_{cog}$ represents a C.O.G. position ratio, $l_r=L-l_f$, $l_f$ represents a length between a front axle and the center of gravity, $l_r$ represents a length between a rear axle and the center of gravity, M represents a mass of the vehicle, $C_f$ represents cornering stiffness of a front tire, and $C_r$ represents cornering stiffness of a rear tire.

5. The apparatus of claim 3, wherein the two-wheel steering-based dynamic model is a single track dynamic model, and the single track dynamic model is defined by the following Equation 4, $$\begin{bmatrix} \dot{V}_y \\ \dot{\gamma} \end{bmatrix} = \begin{bmatrix} -\dfrac{2(C_{\alpha f}+C_{\alpha r})}{mV_x} & -V_x - \dfrac{2(C_{\alpha f}l_f + C_{\alpha r}l_f)}{mV_x} \\ -\dfrac{2(C_{\alpha f}l_f + C_{\alpha r}l_r)}{I_z V_x} & -\dfrac{2(C_{\alpha f}l_f^2 + C_{\alpha r}l_r^2)}{I_z V_x} \end{bmatrix} \qquad \text{[Equation 4]}$$

$$\begin{bmatrix} V_y \\ \gamma \end{bmatrix} + \begin{bmatrix} \dfrac{2C_{\alpha f}}{m} \\ \dfrac{2C_{\alpha f}l_f}{I_z} \end{bmatrix}\delta_f$$

Where $\dot{\gamma}$ represents a rate of change of a yaw rate, $\dot{V}_y$ represents a rate of change of a lateral velocity, γ represents a yaw rate, $V_y$ represents a lateral velocity, $l_f=L\times x_{cog}$, $l_r=L-l_f$, L represents the wheel base of the vehicle, $l_f$ represents a length between the front axle and the center of gravity, $l_r$ represents a length between the rear axle and the center of gravity, $x_{cog}$ represents a C.O.G. position ratio, $C_{\alpha f}$ represents the cornering stiffness of the front tire, $C_{\alpha r}$ represents the cornering stiffness of the rear tire, $V_x$ represents longitudinal velocity, $\delta_f$ represents the steer angle of the front wheel, m represents the mass of the vehicle, and $I_z$ represents a z-axis rotational inertial moment of the vehicle.

6. A method for controlling vehicle stability based on a Rear Wheel Steering (RWS), performed by an electronic control unit (ECU) of a vehicle, the method comprising:

generating a reference, which represents a vehicle status, based on a front wheel steer angle, a drive mode, a curve set, and a sensor signal transmitted from an in-vehicle network, by a vehicle status reference generator;

estimating lateral velocity and disturbance, based on front and rear wheel steer angles and the sensor signal transmitted from the in-vehicle network, by a vehicle status estimator;

calculating an RWS target position value, based on the vehicle status reference, the sensor signal transmitted from the in-vehicle network, the front wheel steer angle, and the estimated lateral velocity and disturbance, by an RWS target position calculator; and generating target motor torque, based on the calculated RWS target position value and an RWS rack position value, by an RWS position controller, wherein the curve set is selected among a plurality of curve sets composed of pairs of a wheel base curve that defines vehicle response characteristics depending on the drive mode and a center of gravity (C.O.G.) curve.

7. The method of claim 6, wherein the generating the reference which represents the vehicle status comprises:

determining one curve set among the plurality of curve sets;

selecting a wheel base and a C.O.G. position based on a vehicle's current speed and the curve set determined by the vehicle parameter curve set unit, and calculating a reference, based on the front wheel steer angle, the wheel base and the C.O.G. position selected by the target vehicle parameter selector.

8. The method of claim 7, wherein the calculating of the reference based on the wheel base and the C.O.G. position selected by the target vehicle parameter selector comprises calculating the reference by receiving the wheel base and the C.O.G. position as input values to a two-wheel steering-based dynamic model.

9. The method of claim 8, wherein the two-wheel steering-based dynamic model is either of a steady-state dynamic model or a single track dynamic model.

10. An apparatus for controlling vehicle stability based on a Rear Wheel Steering (RWS) system, the apparatus comprising:

one or more memory units storing instructions; and one or more processors executing the instructions, wherein executing the instructions by the one or more processors causes the one or more processors:

to receive sensor data collected in an electronic device of the vehicle;

to estimate a vehicle status using a vehicle status estimator;

to generate a reference representing a vehicle status using a vehicle status reference generator, based on a curve set that is selected among a plurality of curve sets composed of pairs of a wheel base curve that defines vehicle response characteristics depending on the drive mode and a center of gravity (C.O.G.) curve;

to calculate a target position value of the RWS system using a target position calculator of the RWS system;

to calculate motor torque required for estimating a position of the RWS system using an RWS position controller; and to drive a motor for estimating the position of the RWS system using the calculated motor torque.

11. The apparatus of claim 10, wherein the executing of the instructions by the one or more processors further causes the one or more processors to estimate lateral velocity and disturbance based on a sensor signal transmitted from an in-vehicle network and front and rear wheel steer angles, in estimating the vehicle status using the vehicle status estimator.

12. The apparatus of claim 10, wherein the executing of the instructions by the one or more processors further causes the one or more processors to generate the reference representing the vehicle status, based on a drive mode, a sensor signal transmitted from an in-vehicle network and a front wheel steer angle, in generating the reference representing the vehicle status using the vehicle status reference generator.

13. The apparatus of claim 10, wherein the executing of the instructions by the one or more processors further causes the one or more processors to update map data required for generating the reference representing the vehicle status using the vehicle status reference generator, in generating the reference representing the vehicle status using the vehicle status reference generator.

14. The apparatus of claim 10, wherein the executing of the instructions by the one or more processors further causes the one or more processors to calculate the target position value of the RWS system, based on the front wheel steer angle, the vehicle status-representing reference generated by the vehicle status reference generator, the sensor signal transmitted from the in-vehicle network, and lateral velocity and disturbance estimated from the vehicle status estimator, in calculating the target position value of the RWS system using the target position calculator of the RWS system.

15. The apparatus of claim 10, wherein the executing of the instructions by the one or more processors further causes the one or more processors to calculate target motor torque based on an RWS target position value generated by the RWS target position generator and an RWS rack position value, in calculating the motor torque required for estimating the position of the RWS system using the RWS position controller.

\* \* \* \* \*